(12) United States Patent
Numazawa

(10) Patent No.: US 12,502,371 B2
(45) Date of Patent: Dec. 23, 2025

(54) DRUG FOR TREATING AND PREVENTING DEMENTIA

(71) Applicant: Numan Labo LLC, Shiga (JP)

(72) Inventor: Toshihiko Numazawa, Shiga (JP)

(73) Assignee: Numan Labo LLC, Shiga (JP)

( * ) Notice: Subject to any disclaimer, the term of this patent is extended or adjusted under 35 U.S.C. 154(b) by 761 days.

(21) Appl. No.: 17/622,624

(22) PCT Filed: Jun. 22, 2020

(86) PCT No.: PCT/JP2020/024444
§ 371 (c)(1),
(2) Date: Dec. 23, 2021

(87) PCT Pub. No.: WO2020/262317
PCT Pub. Date: Dec. 30, 2020

(65) Prior Publication Data
US 2022/0362202 A1    Nov. 17, 2022

(30) Foreign Application Priority Data

Jun. 27, 2019 (JP) ................................ 2019-119273

(51) Int. Cl.
*A61K 31/27* (2006.01)
*A61K 31/085* (2006.01)
*A61P 25/28* (2006.01)

(52) U.S. Cl.
CPC ............ *A61K 31/27* (2013.01); *A61K 31/085* (2013.01); *A61P 25/28* (2018.01)

(58) Field of Classification Search
CPC ........ A61K 31/27; A61K 31/085; A61P 25/28
USPC ....................................................... 514/479
See application file for complete search history.

(56) References Cited

U.S. PATENT DOCUMENTS

| | | | |
|---|---|---|---|
| 6,562,865 B1 | 5/2003 | Codd et al. | |
| 2016/0193161 A1 | 7/2016 | Hill | |

FOREIGN PATENT DOCUMENTS

| | | | | |
|---|---|---|---|---|
| JP | 2003-507421 A | 2/2003 | | |
| JP | 2009-502914 A | 1/2009 | | |
| JP | 2017-088584 A | 5/2017 | | |
| WO | 2007/018496 A1 | 2/2007 | | |
| WO | WO-2015023830 A1 | * | 2/2015 | ............ A61K 31/27 |
| WO | WO-2018204765 A1 | * | 11/2018 | ............ A61P 25/14 |

OTHER PUBLICATIONS

Matosevic et al., Carbamate Group as Structural Motif in Drugs: A Review of Carbamate Derivatives used as Therapeutic Agents, Arh. Hig. Rada. Toksikol. 2020, vol. 71(4), pp. 285-299 (Year: 2020).*
Mayo Clinic, Rivastigmine, Description, 2024, https://www.mayoclinic.org/drugs-supplements/rivastigmine-oral-route/side-effects/drg-20065860?p=1 (Year: 2024).*
Perneczky, Dementia treatment versus prevention, Dialogues Clin. Neurosci., 2019, vol. 21(1), pp. 43-51. (Year: 2019).*
Patent Cooperation Treaty, International Search Report of the International Searching Authority for International Application No. PCT/JP2020/024444 dated Jul. 28, 2020 and English Translation (6 pages).
Patent Cooperation Treaty, Written Opinion of the International Searching Authority for International Application No. PCT/JP2020/024444 dated Jul. 28, 2020, non-English (3 pages).
Beraki, Simret et al., A Pharmacological Screening Approach for Discovery of Neuroprotective Compounds in Ischemic Stroke, PLOS ONE, Jul. 2013, vol. 8, No. 7, e69233, pp. 1-13.
Lopez Ana et al., Carbonic anhydrase inhibition ameliorates tau toxicity via enhanced tau secretion, Nature Chemical Biology, Oct. 31, 2024, Retrieved from the Internet, <URL: https://www.nature.com/articles/s41589-024-01762-7>, 39 pages.
Magnesium, methocarbamol infusion provides relief in trigeminal neuralgia, Jun. 24, 2025, Retrieved Jul. 28, 2025 from the Internet, <URL: https://www.healio.com/news/neurology/20250624/magnesium-methocarbamol-infusion-provides-relief-in-trigeminal-neuralgia>, 4 pages.

* cited by examiner

*Primary Examiner* — Jeffrey H Murray
*Assistant Examiner* — Rilla Marie Samsell
(74) *Attorney, Agent, or Firm* — Fitch, Even, Tabin & Flannery, LLP

(57) ABSTRACT

The pharmaceutical composition for treating dementia, comprising a mephenesin analogue compound and/or a compound with a carbamate structure. A therapeutic drug that can fundamentally treat dementia without causing side effects, such as an increase/decrease in body weight, loss of appetite, sexual debility, and symptoms of withdrawal can be provided with the pharmaceutical composition defined in the present invention. Combining this pharmaceutical composition with other pharmaceutical compositions, including cholinesterase inhibitors, can provide the most certain treatment method according to the symptoms.

4 Claims, No Drawings

DRUG FOR TREATING AND PREVENTING DEMENTIA

CROSS-REFERENCE TO RELATED APPLICATIONS

This application is a U.S. national phase application filed under 35 U.S.C. § 371 of International Application Number PCT/JP2020/024444, filed Jun. 22, 2020, designating the United States, which claims priority from Japanese Patent Application Number JP 2019-119273 filed Jun. 27, 2019.

TECHNICAL FIELD

This invention relates to a novel pharmaceutical composition for treating and preventing dementia.

BACKGROUND ART

With the expanding aged population and the declining birth rate in recent years, Dementia has become a growing challenge. It is considered a disease that causes significant impairment to social and daily life due to memory loss and impaired judgement. There are 24.3 million patients with dementia, and 4.6 million new cases of dementia are diagnosed each year worldwide, according to 2016 statistics. It is highly desirable to establish treatment methods for dementia because of the increasing number of patients and the prolonged nature of the disease.

Compounds that show cholinesterase inhibitory action (AChE inhibitory action) (hereinafter cholinesterase inhibitors) are frequently used in the treatment of dementia, particularly Alzheimer-type dementia. Donepezil hydrochloride is a typical example of these cholinesterase inhibitors. Patent Document 1 is cited as a document disclosing donepezil hydrochloride used for the treatment of dementia.

RELATED ART DOCUMENTS

Patent Documents

Patent Document 1: Japanese Unexamined Patent Publication No. 2003-525903

SUMMARY OF INVENTION

Problems to be Solved by the Invention

The use of cholinesterase inhibitors represented by donepezil hydrochloride to treat dementia is intended only for mild to moderate forms of Alzheimer-type of disease. Cholinesterase inhibitors are not adequate for treating severe Alzheimer-type dementia because they have the effect of delaying its progression, but they do not treat the root cause of the disease. Therefore, drugs are strongly desired that surely and safely treat dementia, specifically Alzheimer-type dementia.

Means for Solving the Problems

The inventors of this compound have found the underlying cause of dementia and the pharmaceutical composition to eliminate said cause based on the results of intensive studies.

The present invention specifically relates to
[1] a pharmaceutical composition for treating dementia, comprising a mephenesin analogue compound and/or a compound with a carbamate structure;
[2] the pharmaceutical composition of [1], comprising one or more compounds with the following structure:

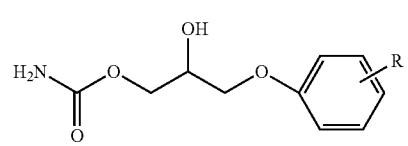

[Formula 1]

(in the formula, R is an alkyloxy group having 1 to 3 carbon atoms or a halogen group);
[3] the pharmaceutical composition of [1] or [2], where R is a methoxy group or a chloro group;
[4] the pharmaceutical composition of any one of [1] to [3], where said compound is chlorphenesin carbamate and/or methocarbamol; and
[5] the pharmaceutical composition of any one of [1] to [4], comprising chlorphenesin carbamate and methocarbamol.

Effects of the Invention

A therapeutic drug that can fundamentally treat dementia without causing side effects, such as an increase/decrease in body weight, loss of appetite, sexual debility, and symptoms of withdrawal can be provided with the pharmaceutical composition defined in the present invention. Combining this pharmaceutical composition with other pharmaceutical compositions, including cholinesterase inhibitors, can provide the most certain treatment method according to the symptoms.

MODE FOR CONDUCTING THE INVENTION

This pharmaceutical composition can be obtained by preparing the mixture with the compounds described below or with other arbitrary components and carriers suitable for formulation.

1. Diseases to be Treated with the Pharmaceutical Composition Defined in the Present Invention The present pharmaceutical composition is meant for preventing or treating dementia.

2. Compound

This pharmaceutical composition contains a mephenesin analogue compound and/or a compound having a carbamate structure.

The present pharmaceutical composition contains preferably one or more compounds with the following structure among the compounds mentioned above.

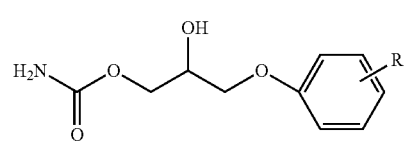

[Formula 2]

(in the formula, R is an alkyloxy group having 1 to 3 carbon atoms or a halogen group)

Examples of the aforesaid alkyloxy group with 1 to 3 carbon atoms as a R include a methoxy, an ethoxy, and a propyloxy group, among others. The alkyloxy group is most preferably a methoxy group.

Examples of the aforesaid halogen group as a R include a chloro, a fluoro, a bromo, and an iodo group, among others. The halogen group is most preferably a chloro group.

There is no restriction as to the binding positions of R. Therefore, the substituent group can be in an ortho, meta, or para position based on the carbon atom on the phenyl group forming an ether bond. R is most preferably in an ortho position when R is an alkyloxy group, and R is most preferably in a para position when R is a halogen group.

A single compound with the structure of the aforesaid compound or a combination of two or more compounds with different structures within the structure of the aforesaid compounds can be used.

The present pharmaceutical composition comprises the aforesaid compounds, and most preferably, chlorphenesin carbamate and/or methocarbamol.

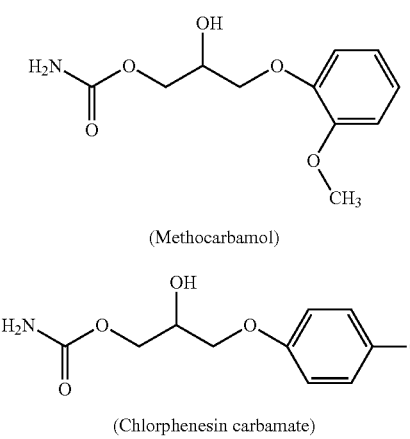

The aforementioned compounds in this pharmaceutical composition can be synthetic or commercial products. Furthermore, the present pharmaceutical composition may contain chlorphenesin carbamate or methocarbamol each as a single compound. This pharmaceutical composition may also contain both chlorphenesin carbamate and methocarbamol, and the intensity of therapeutic effect and action time for diseases can be adjusted by containing both compounds.

The inventors of this compound believe that dementia may be caused not only by an accumulation of amyloid β and a decrease in acetylcholine, which have been generally accepted as the causes, but also by other factors. Therefore, they devised the present invention based on this belief. Compounds showing anticholinergic action (hereinafter anticholinergic compounds) may be contained not only in medicines such as gastrointestinal drugs but also in foods. Anticholinergic compounds can easily cross the blood-brain barrier and, therefore, anticholinergic compounds continue to circulate in the body including the head after they are absorbed. Furthermore, anticholinergic compounds themselves are metabolized, decomposed, and eliminated from the body after they are absorbed. However, some metabolites remain in the body at low concentrations. Accordingly, the level of metabolites of anticholinergic compounds, which were accumulated and circulate in the body, increases with age. Thus, neurotransmitter activity in the frontalis muscle is lowered and inactivated when anticholinergic drugs, which are accumulated and circulate in the body including the head, accumulate in the muscles on the inner-outer interface of the skull (e.g., the frontalis muscle), causing tension in the frontalis muscles. The frontalis muscles cannot move during a state of tension, thus accelerating the accumulation of metabolites of anticholinergic compounds. Increases in the concentration of metabolites of anticholinergic compounds in the muscles on the inner-outer interface of the skull also reduce neurotransmitter activity in the neurons that control the thought process. Thus, abnormalities in cognitive functions such as the ability to think occur due to the action of excessively accumulated metabolites of anticholinergic compounds, which leads to the onset of dementia, such as Alzheimer-type dementia.

Administration of the aforementioned compounds contained in this pharmaceutical composition can relax the muscles on the inner-outer interface of the skull (e.g., the frontalis muscles). Increased frontalis muscle activity released from tension facilitates the elimination of the accumulated metabolites of anticholinergic compounds from the frontalis muscles. Decreased levels of accumulated metabolites of anticholinergic compounds in the frontalis muscles cause the activity of neurotransmitters on neurons that control thinking to resume, thus leading to restoration of cognitive functions such as memory and thinking.

As described above, multiple factors are involved in combination in the onset of dementia. It is most preferable to prepare pharmaceutical compositions for administration according to the symptoms when treating these diseases. The present pharmaceutical composition may include drugs other than the aforementioned compounds, such as cholinesterase inhibitors. Furthermore, this pharmaceutical composition may include the aforesaid compound as the only anti-dementia drug to achieve a treatment plan based on the cause.

The amount of compound in the present pharmaceutical composition may vary according to the structure of the selected compound, the patient's symptoms, the dosage form, and the amount required for one administration. For example, a general formulation amount includes the amount of the compound at 1% to 90% of the mass, preferably 1% to 85% of the mass, and most preferably 1% to 80% of the mass. The total amount of these compounds may be within the range of the above-mentioned blending amount when two or more compounds with the above-mentioned structure are contained in this pharmaceutical composition.

3. Carriers

Any of the carriers that can be used in the production of pharmaceutical compositions may be adopted without any limitation when preparing the present pharmaceutical composition.

These carriers include fillers, extenders, binders, wetting agents, disintegrants, surfactants, diluents such as a lubricant, and excipients, which are substances that are commonly used in pharmaceutical compositions.

Appropriate use of these carriers depends on the dosage form.

The use of specific carriers is described below for each dosage form.

4. Adequate Formulation of the Present Pharmaceutical Composition

The present pharmaceutical composition can employ any generally accepted formulation.

For example, solid dosage for internal use by oral administration of pills, capsules, powders, and granules, ingestion liquid medicine of water agents, suspending agents, emulsions, syrups, and elixirs, and dosage forms for non-parenteral administration of ointments, gelling agents, cream agents, poultice agents, patches, sprays, inhalation agents, spray agents, and injection agents can be adopted for the present pharmaceutical composition.

5. Appropriate Carriers for Each Dosage Form

Excipients such as lactose, mannitol, glucose, non-crystalline cellulose, and starch, a binder such as hydroxypropyl cellulose, polyvinyl pyrrolidone, and magnesium metasilicate aluminate, and a disintegrant such as cellulose glycolate may be used as carriers. Lubricants such as magnesium stearate, a dissolution aid such as glutamic acid or aspartic acid, and a stabilizer may also be used. The formulation may be coated with a single layer or multiple layers.

For example, purified water, ethanol, or a mixture of both can be used as a diluent in the liquid for internal use.

The above diluent may optionally include a wetting agent, a suspending agent, an emulsifier, a sweetener, a flavoring agent, one or more components selected from an aromatic, a preservative, and a buffering agent.

Carriers that can be used in ointments are adequate for use with the present pharmaceutical composition, including the following: higher fatty acid or higher fatty acid ester (adipic acid, myristic acid, palmitic acid, stearic acid, oleic acid, adipic acid ester, myristic acid ester, palmitic acid ester, stearic acid ester, oleic acid ester, etc.), waxes (beeswax, spermaceti, ceresin, etc.), and a surfactant (polyoxyethylene alkyl ether phosphate ester, etc.), higher alcohols (cetanol, stearyl alcohol, ceetostearyl alcohol, etc.), silicone oil (dimethylpolysiloxane, etc.), hydrocarbons (hydrophilic petrolatum, white petrolatum, refined lanolin, liquid paraffin, etc.), glycols (ethylene glycol, diethylene glycol, propylene glycol, polyethylene glycol, macrogol, etc.), vegetable oil (castor oil, olive oil, sesame oil, tele-pin oil, etc.), animal oil (mik oil, yolk oil, squalane, squalene, etc.), water, an absorption promoter, an anti-shake agent, a humectant, a preservative, a stabilizer, an antioxidant, and a flavoring agent, etc.

Carriers that can be used in gel agents are adequate for use with this pharmaceutical composition, including the following: lower alcohols (ethanol, isopropyl alcohol, etc.), gelling agents (carboxymethyl cellulose, hydroxyethyl cellulose, hydroxypropyl cellulose, ethyl cellulose, etc.), a neutralizing agent (triethanolamine, diisopropanolamine, etc.), a surfactant (polyoxyethylene glycol monostearate), gums, water, absorption enhancers, an anti-shake agent, a preservative, an antioxidant, and a flavoring agent, etc.

Carriers that can be used in cream agents are adequate for use in the present pharmaceutical composition, including higher fatty acid esters, lower alcohols, hydrocarbons, polyhydric alcohols (propylene glycol, 1,3-butylene glycol, etc.), higher alcohols (2-hexyldecanol, cetanol, etc.), an emulsifier (a polyoxyethylene alkyl ether, a fatty acid ester, etc.), water, an absorption promoter, an anti-shake agent, a preservative, an antioxidant, and a flavoring agent, etc.

Carriers that can be used in poultices are adequate for use in this pharmaceutical composition, including a thickener (polyacrylic acid, polyvinyl pyrrolidone, gum arabic, starch, gelatin, methyl cellulose, etc.), a wetting agent (urea, glycerin, propylene glycol, etc.), a filler (kaolin, zinc oxide, talc, calcium, magnesium, etc.), water, a dissolution aid, tackifiers, anti-shake agents, preservatives, antioxidants, and flavoring agents, etc.

Carriers that can be used in patches are adequate for use in this pharmaceutical composition, including a polymer base, oil, fat, higher fatty acid, tackifiers, anti-shake agents, preservatives, antioxidants, and flavoring agents, etc.

Carriers that can be used in liniment agents are adequate for use in this pharmaceutical composition, including alcohols (ethanol, polyethylene glycol, etc.), a higher fatty acid, a glycerin, a soap, an emulsifier, a suspending agent, a preservative, an antioxidant, and a flavoring agent, etc.

Carriers used in sprays, inhalants, and sprays agents are also adequate for use in this pharmaceutical composition, including stabilizers such as sodium hydrogen sulfite other than the generally used diluent, and a cushioning material that provides isotonicity, such as sodium chloride, sodium citrate, citric acid, etc.

Injectable compositions for parenteral administration, solution, suspension, an emulsion, and a solid injection which is dissolved or suspended in a solvent when used, etc. are appropriate for use in the present pharmaceutical composition.

The injection solution is used by dissolving, suspending, or emulsifying one or more active substances in a solvent. Examples of an adequate solvent include distilled water for injection, physiological saline, vegetable oil, propylene glycol, polyethylene glycol, alcohols such as ethanol, and combinations of the above.

Furthermore, these injection agents may be included with a stabilizer, a dissolution aid (glutamic acid, aspartic acid, polysorbate 80 [registered trademark], etc.), a suspending agent, an emulsifier, a pain-free agent, a buffering agent, a preservative, etc.

Adequate inhalation agents for parenteral administration include aerosol agents, inhalation powder agents, or inhalation liquid agents.

The inhalation solution may be dissolved or suspended in water or another suitable medium prior to use.

For example, in the case of a liquid for inhalation, preservatives (benzalkonium chloride, paraben, etc.), coloring agents, buffering agents (sodium phosphate, sodium acetate, etc.), isotonic agents (sodium chloride, concentrated-glycerin, etc.), thickeners (carboxyvinyl polymers, etc.), and absorption promoters, etc. may be adequately selected and prepared as needed.

In the case of inhalation powder, lubricants (stearic acid and its salts, etc.), binders (starch, dextrin, etc.), excipients (lactose, cellulose, etc.), colorants, preservatives (benzalkonium chloride, paraben, etc.), and absorption promoters, etc. may be adequately selected and prepared as needed.

A spray device (atomizer, nebulizer) is usually used when administering an inhalation solution and an inhaler for a powder medicine is usually used when administering an inhalation powder.

5. Method for Producing the Present Pharmaceutical Composition

This pharmaceutical composition can be manufactured using a conventional method for producing a pharmaceutical composition. For example, the compound is added to one of the above-mentioned carriers and mixed when tablets are used as the dosage form. A tablet of arbitrary size can be produced by compressing the mixture obtained.

7. Use of the Present Pharmaceutical Composition for the Treatment of Dementia

This pharmaceutical composition can be used for treating dementia, as mentioned above. Furthermore, the present pharmaceutical composition may be used in combination with other therapeutic drugs that have been used for treating dementia, including cholinesterase inhibitors.

The dosages of the present pharmaceutical composition for treating dementia may vary according to the type and amount of the compound(s) included in the pharmaceutical composition. Dosage will also depend on the patient's age, body weight, and symptoms, as well as the treatment effects and methods of administration.

The administration amount shown below is expressed as the amount administered per day to one 60-kg adult.

The following dose is based on a one-per-day regimen. However, it may be administered at once or multiple times (for example, two to six times) if necessary. The general administration amount of the compound included in this pharmaceutical composition is 10-10,000 mg, preferably 300-8,000 mg, and most preferably 500-6,000 mg.

When chlorphenesin carbamate is used as a compound in the present pharmaceutical composition, an adequate amount for administration would be 10-10,000 mg, preferably 300-8,000 mg, and most preferably 500-6,000 mg.

When a methocarbamol is used as a compound in the present pharmaceutical composition, an adequate amount for administration would be 10-10,000 mg, preferably 300-8,000 mg, and more preferably 500-6,000 mg.

When both chlorphenesin carbamate and methocarbamol are used as compounds in the present pharmaceutical composition, an adequate amount of administration would be ~10,000 mg, preferably 300-8,000 mg, and most preferably 500-6,000 mg.

An appropriate mixing ratio of chlorphenesin carbamate to methocarbamol would be 10:90 to 90:10, in this case, preferably 30:70 to 70:30, and most preferably 40:60 to 60:40.

The mixing ratio within range, the degree of the therapeutic effect on the disease, and the action time can be adjusted according to each case.

The following examples provide a more detailed description of the potential pharmaceutical compositions of this invention. Of course, the examples do not limit the scope of the present invention.

Example 1

The Y-maze test was performed in mice divided into three types A, B, and C.

The mice were placed in a Y-maze and allowed to move freely for 6 minutes. The sequence of entries into each arm and the total number of arm entries were measured since mice have the habit of always choosing a new arm of the maze. In order to evaluate the degree of memory impairment, the correct alternation rate was calculated based on the percentage of correct arm entries out of the total number of arm entries.

Mice of types A, B, and C received drugs as shown below.

|  | Methocarbamol 461 mg/kg | Scopolamine 1 mg/kg |
| --- | --- | --- |
| A mice | No administration | No administration |
| B mice | No administration | Administered 30 min before test |
| C mice | Administered 24 hours before + 2.5 hours before test (dosed twice) | Administered 30 min before test |

The total number of entries and percentage of correct alternations were analyzed based on data obtained from the Y-maze test.

Four mice from each type were examined.

The data for total motor activity (number) are shown in the following table.

The results indicate that total motor activity decreased in the order of B>A>C (scopolamine>no administration>methocarbamol+scopolamine).

The following table shows the correct alternation rate (%) data.

As with the results, the correct alternation rate decreased in the order of A>C>B (no administration>methocarbamol+scopolamine>scopolamine).

| Type | Administration |  | Total motor activity | Correct alternation rate (%) |
| --- | --- | --- | --- | --- |
| A mice | No administration | Mean | 44.3 | 70.7 |
|  |  | standard deviation | 3.6 | 4.2 |
|  |  | vs scopolamine | 0.6101 | 0.0073 |
| B mice | Scopolamine | Mean | 47.3 | 49.3 |
|  |  | Standard deviation | 4.2 | 3.5 |
|  |  | — | — | — |
| C mice | Methocarbamol + Scopolamine | Mean | 43.8 | 59.2 |
|  |  | standard deviation | 1.9 | 5.9 |
|  |  | vs scopolamine | 0.4801 | 0.1931 |

The following animals were used in the experiments.

Species: mouse

Strain: Crj:ICR

Sex: male

Age in weeks: 4

The above results demonstrated that methocarbamol had the effect of improving cognitive function based on data for total motor activity and correct alternation rate.

Example 2

Drugs were administered to mice under the same conditions as in Example 1 except for age (10 weeks old in Example 2). The frontalis muscles of the mice were then collected instead of performing the Y-maze test.

Finally, the frontalis muscle was subjected to measurement using LC-MS/MS.

<Method for Preprocessing the Frontalis Muscle>

The frontalis muscles of the mice were collected and 0.2 mL/50 mg of methanol was added.

Centrifugation was performed after mixing and stirring for 3 minutes. The same amount of methanol was added again to the residue, and the mixture was centrifuged. The filtrate was mixed and injected into the LC-MS/MS.

<LC-MS/MS Measurement Conditions for the Frontalis Muscle>

The system consisted of a LC unit (Prominence, Shimadzu Corp.) and a MS unit (LC-MS8050, Shimadzu Corp.).

COSMOSIL 5C18-MS-II (2.0 mm I.D.×150 mm) manufactured by NACALAI TESQUE was used as the column.

Solvent A was 10 nmol/L ammonium formate and solvent B was methanol. Flow rate was 0.2 mL/min.

Sample injection quantity was 10 µL.

The characteristic results of LC-MS/MS of the frontalis muscle are shown in the table below.

A peak area ratio was calculated in reference to the peak area of a substance with molecular weight 124.2, which is commonly present in all samples and has the largest peak area, defined as 100. A comparison of area ratios of various peaks was made.

| Molecular weight | A mice | B mice | C mice |
| --- | --- | --- | --- |
| 124.2 | 100 | 100 | 100 |
| 267.3 | — | — | 5.09 |
| 272.35 | — | — | 5.27 |
| 340.45 | — | 6.88 | — |
| 382.4 | — | — | 6.73 |
| 397.4 | — | — | 5.54 |

A characteristic peak with molecular weight 340.45 existed in the B mice, which received scopolamine alone.

However, there was no peak with molecular weight 340.45 in the C mice, which received scopolamine+methocarbamol. These results suggest that a cause of cognitive impairment is a substance with molecular weight 340.45, and methocarbamol impedes accumulation of this substance with molecular weight 340.45.

Therefore, it can be inferred that the presence of methocarbamol affects anticholinergic agents such as scopolamine and improves cognitive function.

According to the results of Example 1 and Example 2, methocarbamol could be effective as a therapeutic or prophylactic drug for dementia.

INDUSTRIAL APPLICABILITY

The pharmaceutical composition of the present invention can provide an effective treatment method and/or prevention method for dementia for patients who have not improved with cholinesterase inhibitors, with fewer side effects compared to conventional drugs.

Specific embodiments of this invention are described below.

[1] The pharmaceutical composition for treating dementia—comprising a mephenesin analogue compound and/or a compound with a carbamate structure.

[2] The pharmaceutical composition of [1]—comprising one or more compounds with the following structure:

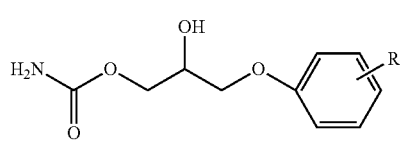

[Formula 5]

(in the formula, R is an alkyloxy group having 1 to 3 carbon atoms or a halogen group)

[3] The pharmaceutical composition of [1] or [2], where R is a methoxy or chloro group.

[4] The pharmaceutical composition of any one of [1] to [3], where said compound is chlorphenesin carbamate and/or methocarbamol.

And,

[5] The pharmaceutical composition of any one of [1] to [4], comprising chlorphenesin carbamate and methocarbamol.

The invention claimed is:

1. A method of relaxing muscles on the inner-outer interface of the skull comprising administering to a subject in need thereof a pharmaceutical composition containing one or more kinds of compounds of the following structure in an amount of about 500-6,000 mg, the muscles having accumulated metabolites of anticholinergic compounds:

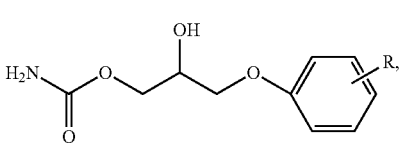

[formula 1]

wherein R is an alkyloxy group containing 1 to 3 carbon atoms or a halogen group, and by relaxing the muscles, accumulated metabolites of anticholinergic compounds are eliminated from the muscles, the pharmaceutical composition includes the one or more kinds of compounds of formula 1 in an amount of 1% to 80% by mass.

2. The method according to claim 1, wherein R is a methoxy group or a chloro group.

3. The method according to claim 1, wherein the compound is chlorphenesin carbamate and/or methocarbamol.

4. The method according to claim 1, which comprises chlorphenesin carbamate and methocarbamol.

* * * * *